United States Patent [19]

Roe et al.

[11] 4,087,599

[45] May 2, 1978

[54] PREPARATION OF A WATER-SOLUBLE POLYVINYLBENZYL QUATERNARY AMMONIUM HALIDE

[75] Inventors: James M. Roe, Midland; Duane B. Priddy, Coleman, both of Mich.

[73] Assignee: The Dow Chemical Company, Midland, Mich.

[21] Appl. No.: 715,733

[22] Filed: Aug. 19, 1976

[51] Int. Cl.$^2$ .......................... C08F 8/24; C08F 8/44
[52] U.S. Cl. .......................... 526/46; 526/21; 526/49; 526/50; 526/346
[58] Field of Search ............... 526/46, 346, 21, 50

[56] References Cited

U.S. PATENT DOCUMENTS

| | | | |
|---|---|---|---|
| 2,479,618 | 8/1949 | Hersberger et al. | 526/346 |
| 3,112,298 | 11/1963 | Welsh | 526/346 |
| 3,222,342 | 12/1965 | Ketley | 526/346 |
| 3,238,186 | 3/1966 | Schultz et al. | 526/346 |
| 3,607,989 | 9/1971 | Sonnabend | 526/46 |
| 3,842,059 | 10/1974 | Milkovich et al. | 526/46 |
| 3,995,094 | 11/1976 | Crosby et al. | 526/46 |

*Primary Examiner*—William F. Hamrock
*Attorney, Agent, or Firm*—David H. Fifield

[57] ABSTRACT

A process for preparation of water-soluble polyvinylbenzyl quaternary ammonium halides by the halomethylation and subsequent quaternization of a polystyrene with the improvement that said polystyrene is a cationically-initiated polystyrene of about 1000 to about 50,000 $\overline{M}_w$ and $\overline{M}_w/\overline{M}_n$ ratio of less than about 8, preferably having less than about 0.1 mole percent residual unsaturation. The quaternized product is useful as a water clarifier and as electroconductive film for copying paper and the like.

9 Claims, No Drawings

PREPARATION OF A WATER-SOLUBLE POLYVINYLBENZYL QUATERNARY AMMONIUM HALIDE

CROSS-REFERENCE TO RELATED APPLICATION

A method for preparing cationically-initiated polystyrene precursor employed herein is described in the copending application of Garner et al. Ser. No. 715,585, filed Aug. 18, 1976.

BACKGROUND OF THE INVENTION

The invention pertains to a method of making a water-soluble, polyvinylbenzyl quaternary ammonium halide by halomethylation of a cationically-initiated polystyrene and subsequent quaternization of the resulting halomethylated product.

Polyvinylbenzyl quaternary ammonium halides have been prepared by chloromethylation and subsequent quaternization of polystyrene or by chlorination of polyvinyltoluene and subsequent quaternization as described in Canadian Patent No. 640,156. The resultant quaternized products, however, appear to be less than about 50 percent quaternized. Moreover, as mentioned by G. D. Jones, *Industrial and Engineering Chemistry*, 44:2686 (1952), formation of insoluble gels occurs in the chloromethylation of polystyrene when carried to greater than about 75 mole percent, due to crosslinking, which renders such a product unfit for uses where the final product must be water-soluble, such as water clarification. Derivatives of polystyrene prepared by addition polymerization have an added drawback in that they have a yellowish or orangeish hue unless the polystyrene is subjected to hydrogenation, a separate procedure involving platinum or platium catalysts with the additional expense thereof.

A soluble, linear polyvinylbenzyl quaternary ammonium halide may be prepared according to the procedure of U.S. Pat. No. 2,780,604 by polymerizing a vinylbenzyl halide monomer and quaternizing the resultant product or by first quaternizing the monomer and thereafter polymerizing to obtain the soluble, linear polymer. The process described for preparing the vinylbenzyl halide monomer involves both halogenation and dehydrohalogenation steps. Possibly due to the relatively large expense involved, only one commercial source of the monomer in the U.S. is presently known to applicants.

SUMMARY OF THE INVENTION

In a process for preparing a water-soluble, polyvinylbenzyl quaternary ammonium halide comprising contacting a polystyrene reactant with a halomethylating agent in the presence of a halomethylation catalyst to form a halomethylated polystyrene and thereafter contacting said halomethylated polystyrene with a tertiary amine:

the improvement of employing as the polystyrene reactant a cationically-initiated polystyrene of $M_w$ about 1,000 to about 50,000 and a $M_w/M_n$ ratio of less than about 8, preferably having less than about 0.1 weight percent residual unsaturation.

Preferred in the invention is a process wherein the halomethylating agent is a chloromethylating agent such as chloromethylmethyl ether. For use in the invention process, a tertiary amine is employed which is suitably pyridine or a compound represented by the formula $NR_1R_2R_3$ wherein $R_1$, $R_2$ and $R_3$ are independently 2-hydroxyethyl, 2-hydroxypropyl, 2,3-dihydroxypropyl, alkyl, aryl, aralkyl or cycloalkyl. A tertiary amine wherein $R_1$, $R_2$ and $R_3$ are independently 2-hydroxyethyl, 2-hydroxypropyl, 2,3-dihydroxypropyl, alkyl of up to 4 carbons, phenyl, benzyl or cyclohexyl, and most preferably wherein $R_1$, $R_2$ and $R_3$ are all methyl, is preferably employed in the process.

The cationically-initiated polystyrene reactant to be employed preferably has an average molecular weight (hereafter $M_w$) of about 4,000 to about 30,000, most preferably about 10,000 to about 20,000. It has a molecular weight distribution (hereinafter $M_w/M_n$) ratio of less than about 8, preferably 2 to about 6 and most preferably about 3 to about 5. The residual unsaturation, as measured by iodine monochloride titration, is less than about 0.1 weight percent preferably less than about 0.05 weight percent and the water-soluble polyvinylbenzyl quaternary ammonium halide product produced by the process has a Gardner color of about 1 unit or less for use as an electroconductive coating.

DETAILED DESCRIPTION OF THE INVENTION

CATIONICALLY-INITIATED POLYSTYRENE REACTANT

The cationic polymerization of styrene to obtain a polystyrene of the desired molecular weight and molecular weight distribution is accomplished by contacting about a 20 to 50 weight percent solution of styrene monomer in a suitable inert solvent with a cation generator, such as a Lewis acid with suitable cocatalyst, under substantially isothermal conditions. Polymerization is carried out by thoroughly mixing the monomer solution with the cation generator and removing sufficient heat from the reaction vessel to maintain the polymerization mass at the desired temperature range. Preferably this is accomplished by passing the monomer solution through a continuous flow reactor vessel and injecting the cation generator, with good mixing, at various points along the flow path of the monomer solution in the reactor.

The polymerization reaction is suitably accomplished by preheating about a 30 percent solution of styrene monomer in ethylene dichloride to from about 20° to about 80° C prior to passing this solution down a tubular reactor made of suitable material resistant to $BF_3$, e.g., Hastelloy alloy, and injecting, with good mixing, a solution of $BF_3$ in ethylene dichloride at at least 2 or more points along the length of the reactor. The styrene monomer solution should contain a trace of water cocatalyst, e.g., about 10 to about 100 ppm based on styrene, to activate the $BF_3$ cation generator.

The amount of $BF_3$ injected is such that by the time a given cross-section of the reaction mass has moved through the reactor vessel, a total of about 1,000 to about 2,000 ppm of $BF_3$, based on styrene, will have been added to the reaction mass. For a given temperature of reaction, decreasing the concentration of the $BF_3$ will proportionately increase $M_w$ of the final product and vice-versa.

The $BF_3$ gas is dissolved in ethylene dichloride by mixing the two components in a closed container under a pressure of about 100 psig to give about a 1.5 weight percent solution of $BF_3$ at about 39° C. This pressure may be supplied by the internal pressure in a cylinder of commercially purchased $BF_3$ gas. This pressure is also useful to force the BF$_3$ solution through conduits to the injection points in the reactor or the solution may be pumped by conventional means. The solution is metered into the reactor in quantities sufficient to attain the desired BF$_3$/styrene ratio, depending on the reactor flow rate. At the point of injection of the BF$_3$ solution it is desirable to have good mixing to insure complete contact between the BF$_3$ and the styrene monomer. This may be accomplished by the insertion of baffles in the line just after the point of injection to create turbulent mixing.

The heat of reaction generated by the contact of BF$_3$ with the wet styrene monomer is removed from the reaction mass by conventional heat exchange means. This is conveniently done by utilizing a shell and tube heat exchanger as the portions of the reaction vessel immediately following the points of injection of the BF$_3$ solution. Depending upon the amount of heat removed immediately after injection, M$_w$ is determined. Maintenance of a lower temperature profile will result in higher M$_w$ of the final product while the more heat that is allowed to remain in the reaction medium, the lower proportionately will be M$_w$. The portion of the reactor immediately following the last BF$_3$ injection point is most conveniently not cooled significantly, allowing the reaction mass to heat up, thereby removing any residual unsaturation that may remain at that point in the reaction mass. The range of M$_w$/M$_n$ is controlled by maintaining the reaction mass at a relatively constant temperature profile while the reaction proceeds, preferably within a narrow temperature range of about 40° C. An average reaction temperature between about 20° C and about 100° C is suitable for the purposes of the invention to give a distribution of M$_w$/M$_n$ of about 3 to 6.

In the preparation of a polystyrene of about 13,000 M$_w$ and M$_w$/M$_n$ of about 5, the monomer solution is preheated to about 60° C prior to the point of the first BF$_3$ injection, is then cooled to about 75° C prior to the second point of injection and cooled to about 50° C prior to the third point of injection. The temperature is thereafter allowed to rise due to exothermic heat of reaction and after the fourth point of injection, a temperature of about 65° C being maintained through these final stages of the reaction. The concentration of monomer is 30 percent by weight in the ethylene dichloride solution and contains about 100 ppm water, based on monomer, and the concentration of BF$_3$, based on total styrene monomer, is about 1500 ppm injected in about equal portions, apportioned about 35:15:20:30, at the first, second, third and fourth injection points, respectively.

After completion of the reaction, the reaction mass is contacted with sufficient ammonia to neutralize all residual BF$_3$ in the polymerization mass and the ammonia:BF$_3$ complex is removed by precipitation and filtration or a brief water wash. The mass then is heated to about 85°, if desired, to distill off the ethylene dichloride solvent and leave the polystyrene product for subsequent use having residual unsaturation of less than about 0.1 weight percent. However, since the halomethylation step is carried out in solution, an ethylene dichloride solution of the polystyrene may be employed so that solvent removal is not necessary at this point.

HALOMETHYLATION

The halomethylation of the cationically-initiated polystyrene may be accomplished by standard techniques well known in the art as described by Jones in the previously cited publication *Industrial and Engineering Chem.*, 44:2686. As a halomethylation agent is employed a suitable halomethylmethyl ether such as chloromethylmethyl ether, bromomethylmethyl ether and the like. Chloromethylmethyl ether is preferred. As catalyst for the halomethylation reaction, standard catalysts are employed such as aluminum trichloride, stannous chloride, zinc chloride and zinc oxide.

Suitably, the catalyst is added to the ether in a ice-cooled bath whereupon an exotherm is observed. After this reaction has taken place, the polystyrene is conveniently added, as about a 20–50 weight percent solution in ethylene dichloride, to the catalyst-ether mixture at ambient temperature and the temperature raised to about 40° to about 60° C and maintained for about 1 to 10 hours or so until a product having the desired degree of halomethylation is obtained. The amount of halomethylation agent to be employed is typically about 1–3 moles or greater per mole of aromatic moiety present in the polystyrene. The amount of catalyst will be approximately 0.05 to 0.5 mole percent, based on the halomethylating agent. When the chloromethylation reaction is as complete as desired, the reaction mixture is cooled, the catalyst and excess halomethylating agent separated and product washed with 2 or 3 water washes to remove residual catalyst and excess halomethylating agent and is then ready for further treatment.

QUATERNIZATION

Quaternization is carried out by contacting the organic solution of halomethylated polystyrene, preferably chloromethylated polystyrene, obtained from the above-described process with an aqueous solution of pyridine or a tertiary amine represented by the formula NR$_1$R$_2$R$_3$ wherein R$_1$, R$_2$ and R$_3$ are as previously described. Amines such as trimethyl amine, dimethylethanolamine, dimethylisopropanolamine, and the like are typically employed. Suitably about a 25 weight percent aqueous solution of the amine is contacted with the halomethylated polystyrene at a temperature of about 40° to 60° C for a time of about 1 to 2 hours or more until the desired degree of quaternization has occured, as determined by standard analytical techniques. The of the tertiary amine solution to be employed is suitably such that it is present in a greater than stoichiometric amount based upon the amount of halomethyl sites to be quaternized. From about 1½ to 2 times the stoichiometeric amount gives a suitable excess.

When quaternization has been completed to the extent desired, the aqueous layer bearing the quaternized product is allowed to separate from the ethylene dichloride organic layer. Excess tertiary amine is suitably evaporated by heating and further concentration of the quaternized product in the aqueous solution may be carried out by evaporating the water from the product to attain the solids concentration desired for the ultimate end use.

SPECIFIC EMBODIMENTS

In a manner similar to that previously described, a polystyrene of about 4400 M$_w$ and M$_w$/M$_n$ ratio of about 2.9 is prepared by preheating to about 75° C a 30 percent solution of styrene monomer in ethylene dichloride, containing about 75 parts per million water, and then contacting same with a total of about 1600 ppm BF$_3$, injected at 4 points. The BF$_3$ is apportioned approximately 46:42:6:6 for the first, second, third and fourth injection points, respectively. The average temperature in the reactor segments following the four injection points is about 85°, 78°, 75° and 72° C, respectively.

In a like manner, a 15 percent solution of styrene monomer in ethylene dichloride, containing about 50 ppm water, is fed at about ambient temperature of 20° C to the reactor and therein contacted with a total of about 2500 ppm $BF_3$, injected at 4 points. The $BF_3$ is apportioned approximately 24:17:24:35: for the first, second, third and fourth injection points, respectively and the average temperature in the respective segments is about 26°, 67°, 51° and 31° C. The polystyrene product has a $M_w$ of about 28,800 and a $M_w/M_n$ ratio of about 4.5 with about 0.6 percent residual unsaturation, as determined by iodine monochloride titration.

A cationically-initiated polystyrene of about 6,000 $M_w$ and a $M_w/M_n$ of about 3 is chloromethylated and quaternized as follows. About 178 grams of about a 28 percent solution of same in ethylene dichloride is slowly added to a stirred solution of chloromethylmethyl ether (75 percent assay) and zinc oxide. The chloromethylmethyl ether-zinc oxide solution is previously prepared by adding about 7.7 grams zinc oxide to 150 cc of the chloromethylmethyl ether. After the mixture has exothermed and been cooled to about 20° C again, the polystyrene solution is added. The mixture is then heated at about 55° C for approximately 2½ to 3 hours to attain approximately 90 percent chloromethylation as determined by IR spectroscopy. The reaction is ultimately quenched with about 20 milliliters of water, stirred for an additional 10 minutes and the ethylene dichloride layer containing the chloromethylated product allowed to separate from the water layer containing the catalyst, excess ether and water. The ethylene dichloride solution containing the product is washed with two 180 cc portions of distilled water.

The chloromethylated product in the ethylene dichloride is next mixed with about 120 grams of a 25 percent aqueous trimethylamine solution and heated at about 45° C for about 1½ hours. The mixture is then cooled and the aqueous layer containing the quaternized product is allowed to separate from the organic layer and decanted. The aqueous product layer is then warmed slightly to remove excess trimethylamine. After drying, the quaternized product is employed to flocculate colloidal particles from river water.

In a like manner, the polystyrene of about 4400 $M_w$, previously described, is chloromethylated and quaternized. The chloromethylmethyl ether-zince oxide solution is prepared by adding about 14.4 grams zinc oxide, in about 2 equal portions, with stirring to about 117cc of the chloromethylmethyl ether which is chilled to less than about 15° C. before each addition of the oxide. About 150 grams of the polystyrene (28% solution in ethylene dichloride) is added and the mixture is then heated to about 55° C. for about 3 to 4 hours to obtain about 100 percent chloromethylation. In the same manner described above, the chloromethylated product is quaternized with about 105 grams of a 25 percent trimethylamine solution and is recovered in a like manner. The quaternized product is useful as a flocculant. Similar products are prepared from cationically-initiated polystyrene having $M_w$ of about 6,000, 10,000 and 25,000 and a degree of quaternization ranging from about 55 up to about 115 mole percent. These quaternized products likewise show utility for the flocculation of suspended solids from river water.

A quaternized product prepared from a cationically-initiated polystyrene of about 13,000 $M_n$ and a $M_w/M_n$ of about 5, when formulated in a standard electroconductive resin formulation and coated on a base stock paper and dried, gives a product which when tested at about 10 percent relative humidity for surface electrical resistance (hereafter SER) shows utility as an electroconductive resin. The log SER is about 10.9 on the wire side of paper treated in this manner. Similar results are obtained with a quaternized product derived from cationically-initiated polystyrene with $M_w$ of about 21,000 and $M_w/M_n$ of about 5.3.

What is claimed is:

1. In a process for preparing a water-soluble, polyvinylbenzyl quaternary ammonium halide comprising contacting a polystyrene reactant with a halomethylating agent in the presence of a halomethylation catalyst to form a halomethylated polystyrene and thereafter contacting said halomethylated polystyrene with a tertiary amine:

the improvement of employing as the polystyrene reactant a cationically-initiated polystyrene of $M_w$ about 1,000 to about 50,000 and a $M_w/M_n$ ratio of less than about 8.

2. The process of claim 1 wherein the halomethylating agent is a chloromethylating agent.

3. The process of claim 1 wherein the tertiary amine is pyridine or a compound represented by the formula $NR_1R_2R_3$ wherein $R_1$, $R_2$ and $R_3$ are independently —$CH_2CH_2OH$, —$CH_2CHOHCH_3$, —$CH_2CHOHCH_2OH$, alkyl, aryl, aralkyl or cycloalkyl.

4. The process of claim 3 wherein $R_1$, $R_2$ and $R_3$ are all methyl.

5. The process of claim 1 wherein the cationically-initiated polystyrene has $M_w$ of about 4,000 to about 30,000.

6. The process of claim 1 wherein the cationically-initiated polystyrene has a $M_w/M_n$ ratio of about 3 to about 5.

7. The process of claim 1 wherein the water-soluble polyvinylbenzyl quaternary ammonium halide produced thereby has a Gardner color of about one unit or less.

8. The process of claim 1 wherein the polystyrene reactant has less than about 0.1 weight percent residual unsaturation.

9. The process of claim 1 wherein the cationically-initiated polystyrene has $M_w$ of about 13,000–21,000, and a $M_w/M_n$ of about 5.

* * * * *

UNITED STATES PATENT AND TRADEMARK OFFICE
CERTIFICATE OF CORRECTION

PATENT NO. : 4,087,599

DATED : May 2, 1978

INVENTOR(S) : James M. Roe and Duane B. Priddy

It is certified that error appears in the above-identified patent and that said Letters Patent are hereby corrected as shown below:

In the following places delete "$M_w$" and insert -- $\bar{M}_w$ --:

Column 1, line 60
Column 2, lines 11 and 61
Column 3, lines 19, 21, 23, and 37
Column 4, line 62
Column 5, lines 14, 18 and 48
Column 6, lines 5, 11, 20, 31, 44 and 57

In the following places delete "$M_w/M_n$" and insert -- $\bar{M}_w/\bar{M}_n$ --:

Column 1, line 61
Column 2, line 13
Column 3, lines 28, 34 and 37
Column 4, line 62
Column 5, lines 14 and 18
Column 6, lines 11, 21, 32, 47 and 58

Column 4, line 62, after "and" insert the word -- a --.

UNITED STATES PATENT AND TRADEMARK OFFICE
CERTIFICATE OF CORRECTION

PATENT NO. : 4,087,599

DATED : May 2, 1978

INVENTOR(S) : James M. Roe and Duane B. Priddy

It is certified that error appears in the above-identified patent and that said Letters Patent are hereby corrected as shown below:

Column 5, line 50, delete "ether-zince" and insert -- ether-zinc --.

Column 6, line 19, after "from" insert the word -- a --.

Signed and Sealed this

Tenth Day of October 1978

[SEAL]

Attest:

RUTH C. MASON
*Attesting Officer*

DONALD W. BANNER
*Commissioner of Patents and Trademarks*